May 26, 1959   J. A. POTCHEN   2,887,740
MEANS FOR PROVIDING MOISTURE TIGHT OPENINGS THROUGH PANELS
Filed March 24, 1954
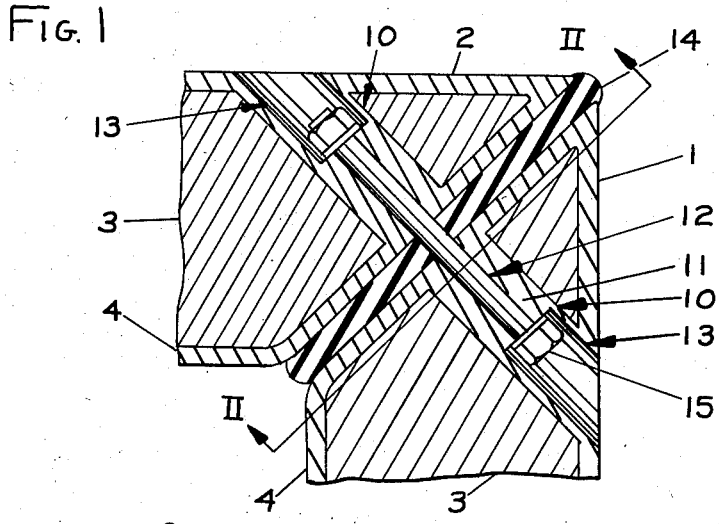
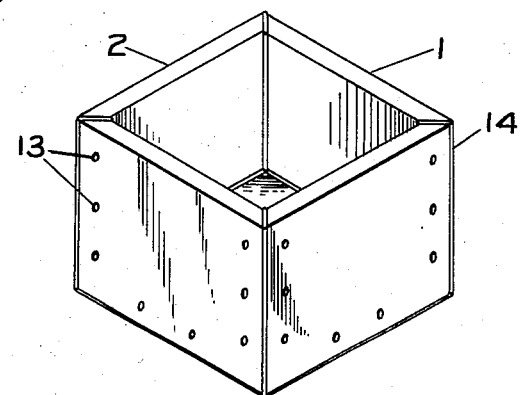
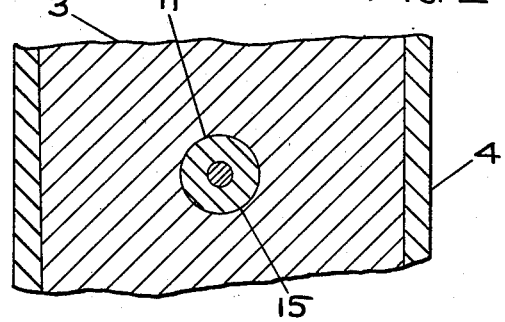
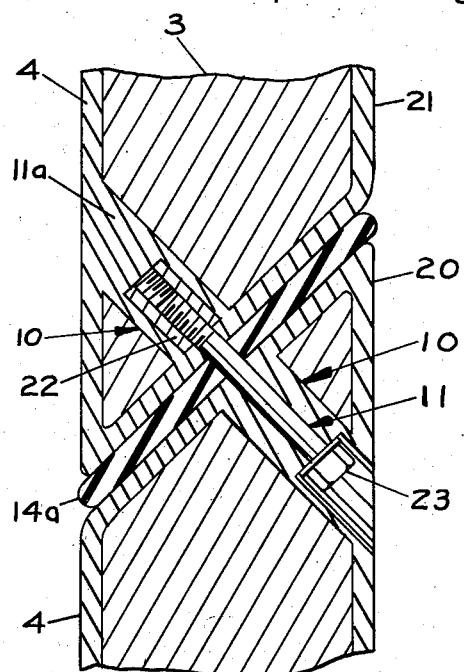
INVENTOR.
JOSEPH A. POTCHEN
BY
ATTORNEY

United States Patent Office 2,887,740
Patented May 26, 1959

2,887,740

MEANS FOR PROVIDING MOISTURE TIGHT OPENINGS THROUGH PANELS

Joseph A. Potchen, Marne, Mich., assignor, by mesne assignments, to Haskelite Manufacturing Corporation, a corporation of Delaware Application March 24, 1954, Serial No. 418,253

3 Claims. (Cl. 20—92)

This invention relates to composite panels and more particularly to the formation of moisture tight openings into or through such panels wherein the core material is pervious to moisture and the facing material is impervious to moisture.

In the construction of composite panels, particularly of the thermal insulating type, the more satisfactory thermal insulating materials are pervious to moisture. Moisture collects rapidly in the core of thermal insulating panels because of the temperature differential across the panel. Thermal insulating materials such as fiber glass and balsa wood will absorb appreciable quantities of moisture, contributing materially to the rapid deterioration of the panel and a substantial reduction in its thermal insulating qualities.

The use of moisture pervious core materials has always created serious problems when it was necessary to join a panel of this type to panels of similar construction or to a supporting structure. While the panel may be faced with a moisture impervious material forming a complete barrier to protect the core, this facing is broken at any point where it is necessary to pass a fastener into or through the panel. The moisture penetrates the panel around the fastener. Within a relatively short time appreciable quantities of it collect within the core.

The primary object of this invention is to provide an inexpensive means by which such fasteners may be anchored to or passed through such panels without destroying the moisture seal surrounding the core.

A further object of this invention is to strengthen the panel in the immediate vicinity of the fasteners. This is important because conventional, thermal insulating, core materials such as fiber glass and balsa wood are structurally weak and incapable of supporting the crushing loads imposed by fasteners.

Still another object of this invention is to provide these advantages by a method and means which is formed integrally and simultaneously with the panel.

These and other objects and purposes of this invention will be immediately seen by those acquainted with the design and fabrication of composite panels upon reading the following specification and the accompanying drawings.

In the drawings:

Fig. 1 is a fragmentary, cross-sectional view of a pair of panels equipped with my invention.

Fig. 2 is a fragmentary, cross-sectional view taken along the plane II—II of Fig. 1.

Fig. 3 is an oblique view of a container built up of panels utilizing my invention.

Fig. 4 is a cross-sectional view of a pair of panels joined in tandem using my invention.

In executing the objects and purposes of my invention, I have provided a panel having a core material and a moisture impervious facing material. A hole is cut through the core material prior to facing the panel. This hole is then filled with the facing material. The material on the face of the panel and in the hole are cured simultaneously. After curing, a secondary opening is bored into or through the post of material formed by filling the original opening. The fastener is inserted in this secondary opening.

Referring specifically to the drawings, the numerals 1 and 2 respectively indicate a pair of panels. Each of the panels is alike, consisting of a central core 3 and a facing 4. The central core 3 may be of any satisfactory material such as balsa wood, fiber glass, rigid expanded rubber or expanded polystyrene. These core materials are merely exemplary of materials which may be used and their recitation is not to be considered as limiting the types of materials with which my invention may be used.

The facing material 4 may likewise be formed of many materials, including resins, either with or without fibrous impregnation. The resin may be of any suitable formula, such as those belonging to the general family of polyester or epoxy resins. The only limitation upon the resins is that they provide a moisture impervious film when cured, be satisfactory for bonding to the core material and provide a satisfactory bond to any fibrous material with which they may be impregnated.

After the core material 3 has been assembled, a large opening 10 is formed in the core. How this opening is formed will depend upon the type of material involved. It may be formed by punching, drilling or any other suitable procedure. After the opening 10 has been formed in the core, it is filled with the same resin as that used to face the panel. This is done at the same time the resin is placed about the panel.

Normally, the core is placed in a die or tray-like structure in which there is placed a suitable quantity of the resin. The openings 10 are then filled with the resin and the panel coated on the sides and top with the same resin. The die is closed with a suitable plate and the whole subjected to heat and pressure sufficient to cure the resin. When the resin is impregnated with a fibrous reinforcement or binder, such as fiber glass, a small quantity of the resin is first placed in the tray and the fiber glass, either impregnated with resin or dry, is placed on top of the initial resin. If the fiber glass is not impregnated, additional resin is added and the core placed on the fiber glass.

The opening 10 is then plugged with fiber glass or whatever fibrous binder is used and additional fiber glass laid over the core and against the sides of the core. Additional resin is then added to impregnate the fiber glass. Sufficient resin is used at this time to fill completely the interstices of the fiber glass in the opening 10.

The panel is then subjected to heat and pressure. This causes the resin to flow evenly over the surface of the panel and to fill all of the interstices in the fiber glass including forcing a portion of the resin into the opening 10 to assure the formation of a solid plug of material therein. After the curing has been completed, a moisture impervious facing entirely surrounds the panel and the same material entirely fills the opening 10, forming a post 11.

After the post 11 has been formed and hardened, a secondary opening 12 is bored through the post 11. To provide a smooth exterior surface, the outer ends of the post are counter-bored at 13 to receive each end of the fastener.

A suitable, resilient gasket 14, such as a rubber gasket, is placed between the end faces of the panels. The panels are then drawn tightly together by means of a bolt 15. The head of the bolt 15 is received in one of the counter-bores 13 and the nut in the other.

The centrally apertured post 11 provides a complete seal about the bolt, preventing the leakage of moisture from the bolt opening to the core. It is essential that the secondary opening 12 be so located within the post 11 that at no point does it breach the walls of the post and thereby provide moisture communication between this opening and the core.

The post 11 also serves another purpose. Since it directly surrounds the bolt, it provides a strong, compression pillar to withstand the crushing loads of the tightened bolt. At the same time, it provides a substantial brace across the corner of the panel, supporting the faces of the panel against crushing. With this pillar, the bolts may be drawn as tight as necessary to form a rigid joint and to compress the gasket 14 sufficiently to prevent any leakage of air or moisture between the gasket and the faces of the panels without fear of damaging the panel in the process. Thus, the post 11 serves an important purpose even in composite panels having a structurally weak but moisture impervious core material such as rigid, expanded rubber.

Even though the core is of a moisture impervious material, it is desirable to seal the interior from moisture penetration to prevent delamination. Unless special adhesives are used, trace quantities of moisture will sometimes enter between the adhesive and the laminae by capillary action. This frequently results in delamination due to hydrostatic pressures built up by the capillary movement of the water.

Fig. 3 shows a box-like structure consisting of panels joined by means of this invention. By placing the bolts diagonally across the corner, no portion of the bolt is exposed to the interior of the structure, thereby eliminating the possibility of corrosion or other damage to the bolt due to moisture or corrosive substances contained within the panelled area. At the same time, all the bolts are freely accessible from the exterior for installation and repairs.

In Fig. 4 there is shown a modification of the invention employing the same principles of construction but adapted to utilize a stud rather than a bolt. While this is illustrated as joining a pair of panels in tandem, it could be used with equal facility at a corner joint of the type illustrated in Fig. 1.

In this construction the panel 20 is provided with a post 11. The post 11a in the panel 21 is similar in structure, composition and the method of formation to post 11 except that at the time the opening 10 for the post is filled with the resin or resin and binder, an internally threaded insert 22 is placed in the opening. The insert 22 is preferably metallic and has a knurled or serrated external face to improve the bond between it and the surrounding resin. Inserts of this type are conventional in design and may be purchased as a standard, commercial product.

The insert is placed in the opening 10 and the inside kept free of resin by any of a number of commonly used expedients such as by placing a threaded member in the insert which projects out through the face of the panel. The end and sides of this threaded member are coated with a suitable parting material to prevent bonding between the threaded member and the resin. After the resin has been cured, the threaded member is removed, leaving a suitable opening through the face of the panel and the interior of the insert free for reception of the threaded end of the stud 23. By this means, the stud 23 may be inserted from the external face of the panel 20 and secured to the panel 21 without any portion of it being exposed in the interior of the unit formed by the panels. A gasket 14a similar to the gasket 14 is placed between the panels to provide an air and moisture tight joint.

While I have shown a preferred embodiment of my invention, it will be recognized that various modifications of this embodiment may be used without departing from the principle of the invention. Each of these modifications is to be considered as included in the hereinafter appended claims unless these claims by their language expressly state otherwise.

I claim:

1. A panel joint construction comprising a pair of panels, each panel having a low density core, at least one end of which is mitered, hard compression-resistant facing sheets adhered to said core and covering said mitered end surface, a post in each said panel integral with said facing sheets extending from said mitered surface through said core to a facing sheet and disposed substantially perpendicularly to said mitered surface, a centrally disposed aperture extending entirely through at least one of said posts, and fastener means in the apertures in each said panel joining the mitered end surfaces of said panels in face to face relationship.

2. A joint construction in accordance with claim 1 wherein the said aperture in the said post of one of said panels is a blind aperture extending inwardly from said mitered surface.

3. A joint construction in accordance with claim 1 wherein there is a sealing member disposed between said mitered surfaces.

References Cited in the file of this patent

UNITED STATES PATENTS

| | | |
|---|---|---|
| 2,021,425 | Nielsen | Nov. 19, 1935 |
| 2,069,301 | Carlson | Feb. 2, 1937 |
| 2,540,468 | Anderson | Feb. 6, 1951 |

FOREIGN PATENTS

| | | |
|---|---|---|
| 580,586 | Great Britain | Sept. 12, 1946 |